United States Patent Office 3,530,032
Patented Sept. 22, 1970

3,530,032
VINYL PEG BOARD LAMINATES BONDED BY AMINE CURING EPOXY ADHESIVES IN A BINARY SOLVENT
Meyer J. Ragir, Highland Park, Ill., assignor to Selfix, Inc., Chicago, Ill., a corporation of Illinois
Filed July 29, 1966, Ser. No. 568,825
Int. Cl. B32b *3/24, 27/38*
U.S. Cl. 161—113
16 Claims

ABSTRACT OF THE DISCLOSURE

A flexible peg board laminate comprising a polyvinyl chloride or polyvinylidene chloride peg board sheet is produced without warping the peg board sheet utilizing epoxy resin and amine curing agent therefor in an organic solvent solution containing a proportion of active solvent for vinyl resin.

---

Figure 1:
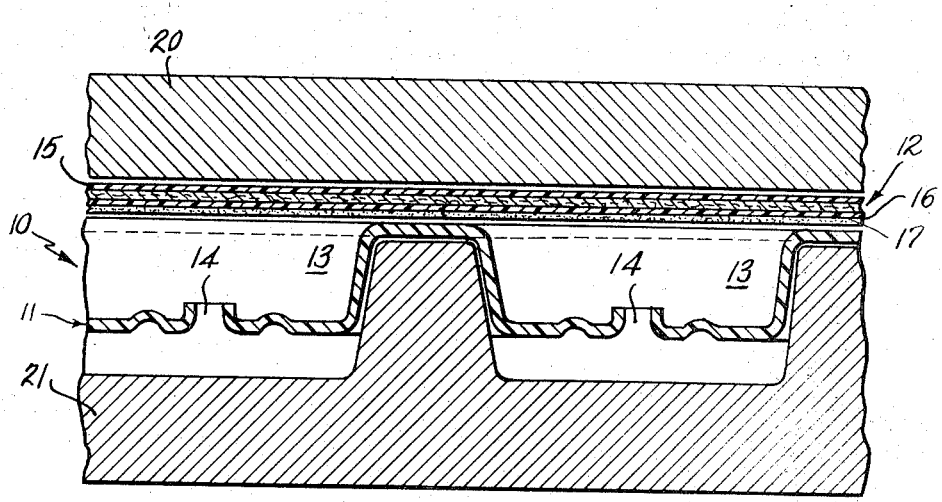

The present invention relates to flexible peg board laminates and the production thereof. More particularly, the invention is concerned with the effective securement of a paper or other inextensible sheet as a backing to a sheet of plastic peg board material without warping the peg board material or injuring the water activatable coating on the paper backing.

Flexible peg board products are known, these including a sheet of flexible tough thermoplastic, especially polyvinyl chloride, which has been deformed by heat and pressure to form raised portions or embossments which extend to one side of the plane of the sheet and which are perforated to receive hooks and the like of the type which are commonly used with perforated hardboard or fiberboard (known as peg board) to hang or otherwise support various objects. The flexible peg board products have the advantage of being useful quickly and easily wherever it can be glued in place while the conventional rigid peg board requires involved construction.

As will be understood, the heat and pressure-deformed plastic sheet which constitutes the primary component of the flexible peg board has only limited utility by itself since it must be strongly adhered to a wall in order to be used and it is poorly adapted to this purpose. First, only a portion of the full surface area is available for adhesion to the wall, e.g., the portion which remains in the plane of the sheet. Second, polyvinyl chloride plastic is smooth and contains few functional groups adapted for chemical bonding so that a good bond is hard to obtain under the best possible conditions which do not exist at the point of application. Lastly, and in the absence of a backing layer which integrates the entire sheet into a unitary mass, applied loads tend to distort the plastic, concentrating the forces which are imposed and causing adhesion to fail progressively whereas it could easily be maintained if the load (which is largely in shear) were uniformly distributed.

Accordingly, it is important to pre-laminate a backing sheet such as a sheet of paper to the rear face of the flexible peg board plastic sheet. In turn, and for ease of application of the composite including the backing sheet to a wall by gluing, it is important to employ a water-activatable coating on the rear face of the backing sheet so that a rapid setting glue can be immediately available in the home or other point of application and readily activated without disturbing the bond which has been established between the backing sheet and the flexible peg board plastic sheet.

It is of interest to note that pressure sensitive adhesives, while of outstanding utility in numerous applications in the home, are not appropriate to the task at hand. Not only do such adhesives require a temporary protective sheet which must be removed at the time of application, but these adhesives form a flexible bond which is poorly adapted to immovably resist a constant load as is applied by an object which has been hung from the peg board for display or storage.

Two important aspects of the problem of the invention should now be evident, namely, the tough polyvinyl chloride thermoplastic sheet which is deformed and which must not warp, and the water activatable coating on the rear face of the backing sheet. Now, polyvinyl chloride thermoplastics, while poorly adapted for chemical bonding, can be mechanically fused to itself and other thermoplastics. Accordingly, it would seem appropriate to coat the inner surface of the backing sheet with polyvinyl chloride and then heat seal the two sheets to one another. However, this creates difficulty since the heat used to bond the sheets causes the deformed peg board sheet to warp and it may damage the water-sensitive coating on the backing. Strong solvents will also soften polyvinyl chloride, but any significant proportion of such a solvent will also tend to warp the plastic peg board sheet. At the same time, chemical bonding of polyvinyl chloride plastics has only limited strength and a strong bond is needed since only that portion of the peg board sheet which lies in the plane of the sheet is available for lamination.

The foregoing presents the essentials of the problem of the invention which also possesses complexities of secondary consideration. Stating these briefly, the pre-application of water-sensitive coating on one side of the backing sheet prior to lamination creates a curling problem since when one wets one side of the paper with migration being restricted by the precoating of the other side, then the paper backing tends to curl away from the peg board sheet and it is difficult to maintain the two in contact for a prolonged period of time by mere stacking of product as is a feature of the invention.

Also, the finished product is preferably flexible and a lamination technique which creates an excessively stiff layer is not preferred because this leads to cracking and some loss of adhesion as well as excessive stiffness in a product in which the ability to be coiled is of importance.

In accordance with the present invention, the inner face of the backing sheet is coated wtih a room temperature-hardenable epoxy resin system dissolved in a hydrocarbon solvent containing a small proportion, e.g., from 5–40% by weight based on total solvent, of an active solvent for vinyl resin. In this way, a strongly adhesive resin system is used in a solvent medium which is largely constituted by organic liquid having no adverse effect on the deformed plastic sheet and a minor amount of active solvent is used to enable a controlled surface softening of the plastic sheet without warping the same. At the same time, the strength of the adhesive is developed during cure, and this enables the relatively weak solvent mixture to be used whereas, and in the absence of a curing reaction, much stronger solvents would be needed for the adhesive.

There is always a tendency for a cross-linking cure to lead to the production of very hard and brittle films and this is avoided in the invention by the fact that room temperature cure of the hardenable epoxy resin system is not a complete reaction. If significantly elevated curing temperatures are used, the room temperature curable mixture tends to become hard and brittle and this reduces the desired flexibility in the final flexible peg board product.

Also, the paper backing sheet is desirably precoated on its inner face with polyvinyl chloride resin. The essentially hydrocarbon solvent material of the epoxy resin system does not extensively soften this precoating so that the paper backing does not curl and the slow room temperature cure can be effected by simply pressing the deformed plastic sheet against the epoxy-coated inner face of the paper backing.

Figure 2:
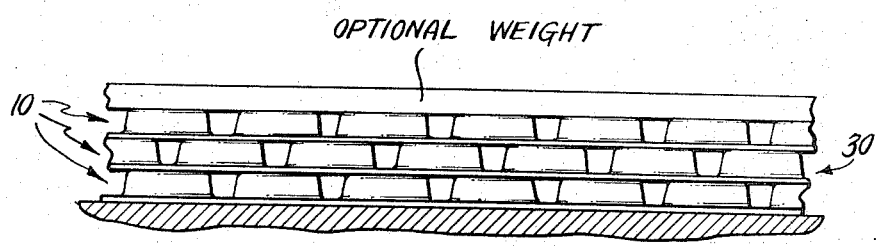

The invention will be more fully understood in connection with the accompanying drawings in which:

FIG. 1 is a partial cross-sectional view on an enlarged scale showing a flexible peg board laminate constructed in accordance with the invention and illustrating the act of assembling the same; and FIG. 2 shows the stack curing of the laminates initially assembled as shown in FIG. 1.

Referring more particularly to FIG. 1, the numeral 10 generically identifies a flexible peg board laminate which is constituted by a heat and pressure deformed polyvinyl chloride plastic sheet 11 which is supported at its rear by being bonded to an inextensible backing sheet 12. As indicated hereinbefore, the backing sheet functions to integrate the plastic sheet 11 into a unitary mass with the entire sheet sustaining any load applied to a single embossment thereof.

Referring more particularly to the deformed plastic sheet 11, this sheet is constituted by a polyvinyl chloride plastic which is tough and strong, although it does have sufficient flexibility to be coiled. As can be seen in FIG. 1, the plastic sheet 11 has been extensively deformed by heat and pressure to form raised portions or embossments 13 which extend to one side of the sheet, e.g., upwardly in FIG. 1. Each of these embossments is perforated as indicated by the numeral 14.

The backing sheet 12 is preferably constituted by a sheet of absorbent paper and the rear face of this sheet (the face remote from the plastic sheet 11) is precoated with a thin layer of water activatable adhesive coating, desirably constituted by a coating of polyvinyl acetate and identified by the numeral 15. The other or inner face of the backing sheet 12 is precoated with a thin layer of polyvinyl chloride identified by the numeral 16. As will later more fully appear, the coating 16 functions as a barrier layer to help prevent the epoxy adhesive from wetting the body of the sheet 12 to prevent curling of the paper sheet 12 when it is surfaced on its inner face with a wet layer of epoxy resin solution while the coating 15 is present in dry form on the rear face thereof. It will be understood that the coatings 15 and 16, when applied on paper, penetrate the surface of the paper and are shown in a diagrammatic form in the drawing. Also, the paper is desirably printed before the coatings are applied for decoration or to include instructions.

Overlying the polyvinyl chloride coating 16 is a wet layer of epoxy resin material identified by the numeral 17. It is convenient to apply the epoxy material 17 uniformly over the entire inner face of the backing sheet 12, but it only functions where it underlies those portions of the plastic sheet 11 which remain in the plane of the original sheet after the embossments 13 have been deformed out of the plane of the sheet.

FIG. 1 lastly shows the plastic sheet 11 juxtaposed over the backing sheet 12 with its wet epoxy adhesive coating interposed between the two sheets. The two sheets 11 and 12 are then pressed together to initially adhere them. This is diagrammatically shown using the pressure platens 20 and 21. In practice, the platen 20 is conveniently replaced in an assembly line by a series of rollers.

As will be understood, the application of modest pressure is sufficient to provide an initial securement of little strength, but the strong bond which is needed develops with time and it normally takes from a few hours to several days before desirable bond strength is achieved. During this time, the solvents in the epoxy resin system perform their surface tackifying function and are lost by evaporation and the epoxy resin cures by room temperature interaction with the hardening agent, suitably an aminaceous curing agent, present in the system.

It is particularly convenient to carry out this slow curing operation by stacking the initially secured products one atop the other so that the plastic sheets 11 are held in contact against the epoxy resin coatings on the inner face of the backing sheets 12 by the weight of the stacked materials.

From the standpoint of completeness, a stack of peg board laminates, broadly identified by numeral 30, is illustrated in FIG. 2.

Since the curing reaction proceeds slowly while the solvents slowly evaporate, the curing reaction does not go to completion and the bond is a flexible one. If insufficient hardening agent is present for a complete cure (less than a stoichiometric amount), then the cure may not go far enough at room temperature to develop its full strength and elevated temperatures become necessary. These are less desirable since they add expense and tend to make the plastic sheet more brittle. When enough hardening agent is present for a good (but incomplete) cure at room temperature, then the use of a bake should be avoided as unnecessary and since it causes excessive brittleness.

As should now be evident, the epoxy resin adhesive is applied wet to the backing sheet and the plastic sheet is pressed against the wet adhesive to provide an initial securement of limited strength. These initially secured sheets form a laminated product which is stacked and allowed to stand until a strong and flexible bond is obtained.

The heat and pressure deformed plastic sheet may be constituted by any high molecular weight tough and flexible thermoplastic since all of these may be deformed to provide the perforated embossments, and all tend to warp when subjected to heat sealing temperatures or active solvents for vinyl resins. The vinyl resins are particularly contemplated, these being thermoplastic addition polymers and copolymers of vinyl chloride or vinylidene chloride containing at least 85% by weight, preferably at least 90% of vinyl chloride or vinylidene chloride (which accounts for the primary properties of the resin), the balance being of secondary consideration, e.g., any unsaturated monomer capable of copolymerization and normally used to promote plasticity such as vinyl acetate, vinyl stearate, ethyl acrylate, methacrylic acid, maleic acid, monobutyl maleate, dibutyl maleate and the like. The preferred other monomers, if used, would contain a single $CH_2=C<$ group. Especially as the polymer approaches a homopolymer of high molecular weight, a small proportion of a monomeric or polymeric plasticizer such as an oily material (natural and synthetic glyceride oils as well as esters such as di-octyl sebacate and phthalate and the like are typical) is useful to make the material more flexible and easy to work with. Plasticizers for polyvinyl chloride plastics are well-known and form no part of the invention.

The epoxy resins which are used may be broadly constituted by any polyepoxide, those having a 1,2-epoxy equivalency of from 1.2–2.0 being preferred. While the aromatic polyepoxides, especially those based on bisphenols (two aromatic groups connected through an intervening divalent alkylene group) are preferred, aliphatic polyepoxides can also be used. Bisphenol A is a particularly preferred aromatic compound on which to base the polyepoxide. Glycerin and ethylene glycol are appropriate aliphatic compounds on which to base a polyepoxide. The epoxy group is preferably carried by the glycidyl group and diglycidyl ethers of bisphenols constitute a preferred group of polyepoxides. Polyepoxides having a molecular weight of from 300 to 2,000 are preferred, those having a molecular weight of from 500 to 1,500 being particularly preferred.

It is to be observed that the polyepoxides will frequently be resinous and possess secondary hydroxyl groups in addition to the 1,2-epoxy group and that these resins are extensively soluble in liquid hydrocarbons, especially the aromatic hydrocarbons such as benzene, toluene, xylene and liquid homologs thereof which are frequently available in commercial mixtures. These hydrocarbons do not dissolve the thermoplastic vinyl chloride or vinylidene chloride polymers and copolymers which have been mentioned which, instead, require much stronger and more polar solvents before they are significantly softened.

Numerous active solvents for vinyl resins are known and may be used, but the preferred active solvents are ketones, especially methyl ethyl ketone. Other useful ketones contain from 2–6 carbon atoms. Other active solvents are illustrated by liquid ester solvents, such as ethyl acetate and butyl propionate, chlorinated hydrocarbons such as chlorobenzene, cyclic ethers such as tetrahydropyran and tetrahydrofuran, nitroparaffins, such as 2-nitropropane and others, for example, isophorone, cyclohexanone, dimethyl formamide, acetonitrile, and propylene carbonate. Dimethyl sulfoxide is also useful.

The key point is proportion. Any of the active solvents, if used alone, will attack the vinyl resin used, but it will also tend to permeate the body of the resin and thereby permit the strains induced by heat and pressure deformation to be relieved. In the invention a film of wet solution is deposited on the inner face of the backing sheet to provide only a limited quantity of solvent. When the major proportion of this solvent is a hydrocarbon solvent (which has no effect on the vinyl resin) then the minor amount of active solvent is limited to a surface effect on the plastic and this minimizes warpage.

Thus, the active solvent for vinyl resin may constitute from 5–40% of the weight of total solvent present, preferably from 10–25%. In these small amounts, good adhesion is obtained and warpage is minimized. As will be evident, the precise proportion of active solvent which will give best results will vary somewhat, dependent upon the strength of the active polar solvent and the solubility characteristics of the specific plastic used to constitue the deformed plastic sheet.

The aminaceous curing agent and the polyepoxide are preferably used in approximately (±20%) stoichiometric amounts based on reactive amine hydrogen atom in the curing agent and oxirane in the polyepoxide. The organic solvent solution of polyepoxide and curing agent may vary in concentration considerably, but generally the adhesive solution has a non-volatile resin solids content of from 10–60%, more usually 20–55%.

The curing agent may be an aminaceaus material capable of cross-linking the polyepoxide slowly at room temperature in organic solvent solution. This is a characteristic of all organic amines which include a plurality of amine hydrogen atoms. The selection of any particular amine is governed by the pot life which it provides and the time required for cure at room temperature.

Referring more particularly to the aminaceous curing agents which may be used, any primary or secondary amine can be utilized so long as it is polyfunctional, e.g., piperidine, ethylene diamine, diethylene triamine and the like being illustrative, though these tend to be somewhat fast acting and therefore of limited value. From the standpoint of slowing the reaction and providing more flexible films, it is preferred to use a resinous amine and this may be provided by adducting the monomeric amine with a resinous material or with a polyfunctional resin-forming material as by utilizing a thermoplastic polyamide resin. Also, properties can be balanced by mixing the amine curing agents together.

The more important amine adducts are adducts with alkylene oxides or with a resinous polyepoxide utilizing the polyamine in excess so as to provide an amine-terminated product. Increased molecular weight and reduced amine reactivity can also be provided by reacting the amine with acrylonitrile to product adducts such as bis-cyanoethyl diethylenetriamine.

The ethylene oxide adducts are typified by the reaction product of a molar excess of diethylene triamine or triethylene tetramine with ethylene oxide.

Since the provision of room temperature-curable mixtures of polyepoxides with polyfunctional amines is well-known in the prior art, a further and more specific elucidation is thought to be unnecessary.

The water activatable coating may be constituted by any dry layer of adhesive which becomes sticky when wetted with water. These are old and well-known per se and are illustrated by polyvinyl acetate which is typically applied as a water solution and dried for use.

With reference to the epoxy adhesives which are used, these may be pigmented if desired, and flow control agents, both reactive and non-reactive, may be present, a reactive diluent being butyl glycidyl ether. Also, and especially when the inner face of the paper backing is not precoated, it is permissible to employ blocking agents and thickening agents to limit penetration, but the utilization of the precoating is distinctly preferred.

As will also be understood, the epoxy adhesive is supplied in two portions so that the resin and the curing agent are kept separate until shortly before use. After the two are mixed together in appropriate proportions, the mixture is slowly reactive at room temperature and, therefore, has only a limited pot life. On the other hand, it is not difficult to consume the adhesive after mixing and before it has become unduly thickened.

To illustrate the invention, an extrude relatively rigid polyvinyl chloride sheet (a copolymer of 90/10 vinyl chloride/vinyl acetate having an intrinsic viscosity in 1% solution in cyclohexanone at 20° C. of 0.79 and plasticized with 4% by weight of dioctyl phthalate) deformed by heat and pressure to provide a flexible peg board sheet is positioned to overlie an inextensible paper backing constituted by a 40 pound per ream sheet of bleached kraft, the rear face of which has been precoated with a 25 pound per ream coating of polyvinyl acetate and the inner face of which is coated with a 12 pound per ream coating of polyvinyl chloride which is dried and then overcoated with a film of epoxy adhesive, the epoxy adhesive being sufficiently thick to be continuous and being wet. The composite is pressed together and stacked and cures considerably in a period of several hours, at which point the product can be removed from the stack. A full room temperature cure takes place in approximately one month at which point an equilibrium is reached in which approximately 88% of the oxirane functionality has been consumed by reaction.

The epoxy adhesive referred to in the illustration is a stoichiometric mixture of Epon 1001 [a substantially diglycidyl ether of 2,2'-bis(p-hydroxyphenylpropane) having an average molecular weight of about 1,000, an epoxide equivalent weight of about 500 (grams per epoxide equivalent weight) and a melting point of from 65–75°] and, as curing agent, an adduct of 3 moles of diethylene triamine with 2 moles of ethylene oxide.

The above-noted resinous polyepoxide and resinous amine curing agent therefore are employed in an organic solvent medium having a resin solids content of 50% and the solvent phase of the adhesive is an 85/15 weight ratio mixture of a commerical mixture of aromatic hydrocarbon solvents having a boiling range of 306–343° F. and methyl ethyl ketone.

The invention is defined in the claims which follow.

I claim:

1. A method of producing a flexible peg board laminate comprising a thermoplastic sheet deformed to include a plurality of perforated embossments extending toward one side with the rear face of said sheet being laminated to an inextensible backing sheet, comprising coating the inner face of said backing sheet with a wet film of epoxy adhesive comprising polyepoxide and amine curing agent therefor in solution in organic solvent comprising hydrocarbon solvent and from 5–40%, based on the total weight of solvent, of active polar solvent for said thermoplastic, pressing said thermoplastic sheet against said wet film of epoxy adhesive, to form a weakly bonded laminate and maintaining said thermoplastic sheet in contact with said epoxy adhesive at about room temperature while said epoxy adhesive cures.

2. A method as recited in claim 1 in which said active solvent is a ketone containing from 2–6 carbon atoms.

3. A method as recited in claim 1 in which said epoxy adhesive is cured at room temperature.

4. A method as recited in claim 3 in which said polyepoxide and said amine curing agent are present in approximately stoichiometric amounts.

5. A method as recited in claim 1 in which said inextensible backing is precoated on its inner face with a thermoplastc resin and has a water-activatable coating on its rear face.

6. A method of producing a flexible peg board laminate comprising a thermoplastic sheet of polymer containing at least 85% by weight of vinyl chloride or vinylidene chloride deformed to include a plurality of perforated embossments extending toward one side with the rear face of said sheet being laminated to an inextensible backing sheet, having a water-activatable coating on its rear face, comprising coating the inner face of said backing sheet with a wet film of epoxy adhesive comprising polyepoxide and amine curing agent therefor in approximately stoichiometric amounts in solution in organic solvent comprising hydrocarbon solvent and from 5–40%, based on the total weght of solvent, of active polar solvent for vinyl resin, pressing said theromplastic sheet against said wet film of epoxy adhesive, to form a weakly bonded laminate, and maintaining said thermoplastic sheet in contact with said epoxy adhesive at room temperature while said epoxy adhesive cures.

7. A method as recited in claim 6 in which said active solvent is a ketone containing from 2–6 carbon atoms.

8. A method as recited in claim 7 in which said ketone is methyl ethyl ketone.

9. A method as recited in claim 6 in which said inextensible backing is paper precoated on its inner face with a thermoplastc polymer containing at least 85% by weight of vinyl chloride or vinylidene chloride.

10. A method as recited in claim 6 in which said weakly bonded laminate is stacked to maintain said thermoplastic sheet in contact with said epoxy adhesive.

11. A method as recited in claim 6 in which said amine curing agent is a resinous polyfunctional amine.

12. A method as recited in claim 11 in which said polyepoxide is a polyglycidyl ether of a bisphenol having a molecular weight of from 300–2,000.

13. A flexible peg board laminate comprising a thermoplastic sheet which has been deformed to include a plurality of perforated embossments extending toward one side of said sheet, the rear face of said thermoplastic sheet remote from said embossments being laminated to an inextensible backing sheet in order to integrate said deformed plastic sheet into a unitary mass, the rear face of said backing sheet having adhered thereto a water-activatable adhesive layer and the inner face of said backing sheet being laminated to the rear face of said deformed plastic sheet by means of a cured epoxy adhesive said adhesive having been applied by the method described in claim 1 and including the solvent system of claim 1, said adhesive further comprising epoxy resin and an amine curing agent therefor.

14. A laminate as recited in claim 13 in which said backing sheet has its inner face precoated with a thermoplastic resin and in which the cured epoxy adhesive bonds the precoated side of said backing sheet to the rear face of the deformed plastic sheet.

15. A flexible peg board laminate comprising a sheet of thermoplastic polymer containing at least 85% by weight of vinyl chloride or vinylidene chloride, said sheet having been deformed to include a plurality of perforated embossments extending toward one side of said sheet, the rear face of said theromplastic sheet remote from said embossments being laminated to an inextensible paper backing sheet in order to integrate said deformed plastic sheet into a unitary mass, the rear face of said backing sheet having adhered thereto a water-activatable adhesive layer and the inner face of said backing sheet being laminated to the rear face of said deformed plastic sheet by means of a cured epoxy adhesive comprising a polyglycidyl ether of a bisphenol having a molecular weight of 300–2,000 and aresinous poly-functional amine curing agent therefor said epoxy adhesive having been applied by the method of claim 1 including the solvent system of claim 1.

16. A laminate as recited in claim 15 in which said paper backing sheet has its inner face precoated with a thermoplastic resin and in which the cured epoxy adhesive bonds the precoated side of said paper backing sheet to the rear face of the deformed plastic sheet.

References Cited

UNITED STATES PATENTS

| | | | |
|---|---|---|---|
| 3,032,460 | 5/1962 | Chipman et al. | 156—330 X |
| 3,142,599 | 7/1964 | Chavannes | 161—131 X |
| 3,231,454 | 1/1966 | Williams | 161—112 X |
| 3,308,006 | 3/1967 | Kresse et al. | 161—250 X |
| 3,425,889 | 2/1969 | Willits | 161—167 X |

JOHN T. GOOLKASIAN, Primary Examiner

W. E. HOAG, Assistant Examiner

U.S. Cl. X.R.

156—330; 161—184